(12) United States Patent
Grobelny et al.

(10) Patent No.: US 11,704,402 B2
(45) Date of Patent: Jul. 18, 2023

(54) RUNTIME DEVICE FIRMWARE VERIFICATION USING TRUST CHAINING

(71) Applicant: DELL PRODUCTS L.P., Round Rock, TX (US)

(72) Inventors: Nicholas D. Grobelny, Austin, TX (US); Richard M. Tonry, Austin, TX (US); Balasingh P. Samuel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 646 days.

(21) Appl. No.: 16/526,467

(22) Filed: Jul. 30, 2019

(65) Prior Publication Data

US 2021/0034733 A1 Feb. 4, 2021

(51) Int. Cl.
*G06F 21/44* (2013.01)
*G06F 9/4401* (2018.01)
*G06F 21/57* (2013.01)

(52) U.S. Cl.
CPC .......... *G06F 21/44* (2013.01); *G06F 9/4411* (2013.01); *G06F 21/575* (2013.01)

(58) Field of Classification Search
CPC .... G06F 21/44; G06F 9/4411; G06F 621/575; G06F 21/575; G06F 21/85
See application file for complete search history.

(56) References Cited

U.S. PATENT DOCUMENTS

| 10,797,987 | B1 * | 10/2020 | Beacham ................ H04L 45/02 |
| 10,952,050 | B2 * | 3/2021 | Tan ......................... H04Q 9/00 |
| 2003/0056051 | A1 * | 3/2003 | Burke .................. G06F 9/4411 |
| | | | 710/302 |
| 2012/0042099 | A1 * | 2/2012 | Wong .................. G06F 21/606 |
| | | | 710/316 |

(Continued)

OTHER PUBLICATIONS

Brown, "Verified Boot: From ROM To Userspace" Linux.com, Feb. 2017, 3 pgs.

(Continued)

*Primary Examiner* — Theodore C Parsons
(74) *Attorney, Agent, or Firm* — Egan, Enders & Huston LLP.

(57) ABSTRACT

Systems and methods are disclosed herein that may implement an information handling system including a gateway and a peripheral device monitor. The gateway may interface peripheral devices and control access of host resources of the information handling system by any of the peripheral devices. The peripheral device monitor may detect connection of an unverified peripheral device to the gateway, perform a trust verification process with the unverified peripheral device, control the gateway to enable access of the host resources by the unverified peripheral device when the unverified peripheral device becomes verified, and control the gateway to prevent access to the host resources by the unverified peripheral device when the unverified peripheral device fails the trust verification process. The trust verification process may include validating a device certifi- (Continued)

cate and verifying a digest of boot code of the peripheral device. The peripheral device monitor may perform a verification failure procedure when the unverified peripheral device fails the trust verification process.

26 Claims, 5 Drawing Sheets

(56) References Cited

U.S. PATENT DOCUMENTS

| | | | | |
|---|---|---|---|---|
| 2014/0196142 A1* | 7/2014 | Louboutin | ............... | G06F 21/44 726/16 |
| 2015/0365237 A1* | 12/2015 | Soffer | ................... | G06F 13/105 726/20 |
| 2016/0294829 A1* | 10/2016 | Angus | ..................... | H04L 63/18 |
| 2017/0235970 A1* | 8/2017 | Conner | ............... | G06F 16/2358 707/690 |
| 2018/0349607 A1* | 12/2018 | Khatri | ................... | G06F 21/575 |
| 2019/0042779 A1* | 2/2019 | Agerstam | ........... | G06F 21/6218 |
| 2021/0112043 A1* | 4/2021 | Duncan | ................... | G06F 21/88 |
| 2021/0112054 A1* | 4/2021 | Bailey | ..................... | H04L 63/10 |

OTHER PUBLICATIONS

Lobo, "USB-IF Launches 'Type-C Authentication Program' For Better Security, Packt Hub", Jan. 2019, 1 pg.
Regenscheid, "Platform Firmware Resiliency Guidelines", NIST Special Publication 800-193, May 2018, 45 pgs.
Shilov, "USB-C Authentication Tech To Restrict Usage Of Uncertified USB-C Accessories And Cables", Anandtech.com, Apr. 2016, 3 pgs.
Balich, "USB-IF Launches USB Type-C Authentication Program", USB Enabling Connections, Press Release, Jan. 2019, 2 pgs.

* cited by examiner

RUNTIME DEVICE FIRMWARE VERIFICATION USING TRUST CHAINING

FIELD

The present invention relates generally to information handling systems, and more particularly, to firmware verification for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many conventional information handling systems may include multiple firmware components that are used to boot the system platform. Firmware verification is a basic input/output system (BIOS) function. During BIOS power-on self test (POST), for example, the BIOS verifies trust chaining to "boot" devices that are initially coupled at boot-up of the system to ensure code integrity for trusted boot. If firmware verification fails, BIOS prevents booting or limits functionality of specific devices that failed verification. Once the BIOS and POST is completed and secure boot transfers control to the operating system (OS), the BIOS does not do additional code integrity checks on any peripheral devices that are subsequently attached or that change state during run-time. For example, some components are hot pluggable, such as docking stations, universal serial bus (USB) devices, hard disk drives (HDDs), etc. In addition, some boot devices that may have established trust upon boot-up could be susceptible to state changes during run-time, such as suspend and resume operations and the like, and should be re-verified. Conventional configurations do not perform firmware integrity during run-time such that the firmware for unverified peripheral devices may become operational thereby increasing potential for attack or otherwise rendering the system subject to damage.

SUMMARY

Disclosed herein are systems and methods that may be implemented to verify trust status of peripheral devices of an information handling system and, in one embodiment, to perform a trust verification process to verify an unverified peripheral device that is connected to the information handling system after secure boot, or that changes state during system run-time.

In one embodiment, an information handling system may be provided that includes a gateway and a peripheral device monitor (PDM). The gateway interfaces peripheral devices and controls access of host resources of the information handling system by any of the peripheral devices. The peripheral device monitor detects connection of an unverified peripheral device to the gateway, performs a trust verification process with the unverified peripheral device, controls the gateway to enable access of the host resources by the unverified peripheral device when the unverified peripheral device becomes verified, and controls the gateway to prevent access to the host resources by the unverified peripheral device when the unverified peripheral device fails the trust verification process. The peripheral device monitor performs a predetermined verification failure procedure when the unverified peripheral device fails the trust verification process.

In one embodiment, the peripheral device monitor may request a device certificate from the unverified peripheral device, validate a received device certificate by comparing with a corresponding reference certificate, request a digest of device boot code and/or critical configuration data (i.e., configuration data required for proper boot) from the unverified peripheral device when the received device certificate is validated, verify a received digest from the peripheral device, and control the gateway to enable access of the host resources by the unverified peripheral device when the received digest is verified.

In one embodiment, the peripheral device monitor may request a device certificate from the unverified peripheral device, validate a received device certificate by comparing with a corresponding reference certificate, and deny access of the host resources by the unverified peripheral device when the received device certificate is determined to be invalid.

In one embodiment, the peripheral device monitor may request a device certificate from the unverified peripheral device, validate a received device certificate by comparing with a corresponding reference certificate, request a digest of device boot code and/or critical configuration data (i.e., configuration data required for proper boot) from the unverified peripheral device when the received device certificate is validated, verify a digest received from the peripheral device, and deny access of the host resources by the unverified peripheral device when the received digest is not successfully verified.

In one embodiment, the trust verification process may include generating a first host nonce, sending the first host nonce with a request for a device certificate to the unverified peripheral device, receiving the device certificate from the unverified peripheral device with a second host nonce, determining that the first and second host nonces are equal to ensure valid communication with the unverified peripheral device, and comparing the received device certificate with a corresponding reference certificate to validate the device certificate.

In one embodiment, the trust verification process may include generating a first host nonce, encrypting and sending a message including a digest request and the first host nonce using a certificate received from the unverified peripheral device, decrypting an encrypted response from the unverified peripheral device to retrieve a device digest and a second host nonce, determining that the first and second host nonces are equal to ensure valid communication with the unverified peripheral device, and comparing the received device digest with a reference digest to verify the device digest.

In one embodiment, the gateway may include at least one controllable input/output port for enabling or disabling access. The unverified peripheral device may be coupled to the gateway after secure boot of the information handling system. The unverified peripheral device may initially be verified upon boot-up of the information handling system, but the peripheral device monitor changes status of the unverified peripheral device to unverified after secure boot in response to a change of state of the unverified peripheral device.

A method according to one embodiment includes detecting connection of an unverified peripheral device to a gateway of an information handling system during run-time of the information handling system, controlling the gateway to initially prevent access of host resources of the information handling system by the unverified peripheral device, performing a trust verification process with the unverified peripheral device, controlling the gateway to allow access of the host resources of the information handling system when the unverified peripheral device passes the trust verification process and becomes verified, and maintaining control of the gateway to prevent access of host resources of the information handling system by the unverified peripheral device when the unverified peripheral device fails the trust verification process.

In one embodiment, the method may include requesting a device certificate from the unverified peripheral device, validating a received device certificate by comparing with a corresponding reference certificate, requesting a digest of device boot code and/or critical configuration data (i.e., configuration data required for proper boot) from the unverified peripheral device when the received device certificate is validated, verifying a received digest from the peripheral device, and controlling the gateway to enable access of the host resources by the unverified peripheral device when the received digest is verified.

In one embodiment, the method may include requesting a device certificate from the unverified peripheral device, validating a received device certificate by comparing with a corresponding reference certificate, and denying access of the host resources by the unverified peripheral device when the received device certificate is determined to be invalid.

In one embodiment, the method may include requesting a device certificate from the unverified peripheral device, validating a received device certificate by comparing with a corresponding reference certificate, requesting a digest of device boot code and/or critical configuration data (i.e., configuration data required for proper boot) from the unverified peripheral device when the received device certificate is validated, verifying a digest received from the peripheral device, and denying access of the host resources by the unverified peripheral device when the received digest is not successfully verified.

In one embodiment, the method may include performing a predetermined verification failure procedure when the unverified peripheral device fails the trust verification process.

In one embodiment, the method may include generating a first host nonce, sending the first host nonce with a request for a device certificate to the unverified peripheral device, receiving the device certificate from the unverified peripheral device with a second host nonce, determining whether the first and second host nonces are equal to ensure valid communication with the unverified peripheral device, and comparing the received device certificate with a corresponding reference certificate to validate the device certificate.

In one embodiment, the method may include generating a first host nonce, encrypting and sending a message including a digest request and the first host nonce using a certificate received from the unverified peripheral device, decrypting an encrypted response from the unverified peripheral device to retrieve a device digest and a second host nonce, determining whether the first and second host nonces are equal to ensure valid communication with the unverified peripheral device, and comparing the received device digest with a reference digest to verify the device digest.

In one embodiment, the method may include providing at least one controllable input/output port for implementing the gateway for enabling or disabling access. The method may include detecting connection of the unverified peripheral device to the gateway after secure boot of the information handling system. The method may include detecting a change of state of the unverified peripheral device that was initially verified upon boot-up of the information handling system, and changing status of the unverified peripheral device to unverified after secure boot in response to the change of state of the unverified peripheral device.

In one respect, disclosed herein is a system, comprising: a gateway that interfaces peripheral devices and that controls access of host resources of an information handling system by any of the peripheral devices; and a programmable integrated circuit that is programmed to: detect connection of an unverified peripheral device to the gateway, perform a trust verification process with the unverified peripheral device, control the gateway to enable access of the host resources by the unverified peripheral device when the unverified peripheral device becomes verified, and control the gateway to prevent access to the host resources by the unverified peripheral device when the unverified peripheral device fails the trust verification process.

In another respect, disclosed herein is a method, comprising: detecting connection of an unverified peripheral device to a gateway of an information handling system during run-time of the information handling system; controlling the gateway to initially prevent access of host resources of the information handling system by the unverified peripheral device; performing a trust verification process with the unverified peripheral device; controlling the gateway to allow access of the host resources of the information handling system when the unverified peripheral device passes the trust verification process and becomes verified; and maintaining control of the gateway to prevent access of host resources of the information handling system by the unverified peripheral device when the unverified peripheral device fails the trust verification process.

BRIEF DESCRIPTION OF THE DRAWINGS

The present invention is illustrated by way of example and is not limited by the accompanying figures in which like references indicate similar elements. Elements in the figures are illustrated for simplicity and clarity and have not necessarily been drawn to scale.

DETAILED DESCRIPTION OF ILLUSTRATIVE EMBODIMENTS

Figure 1:
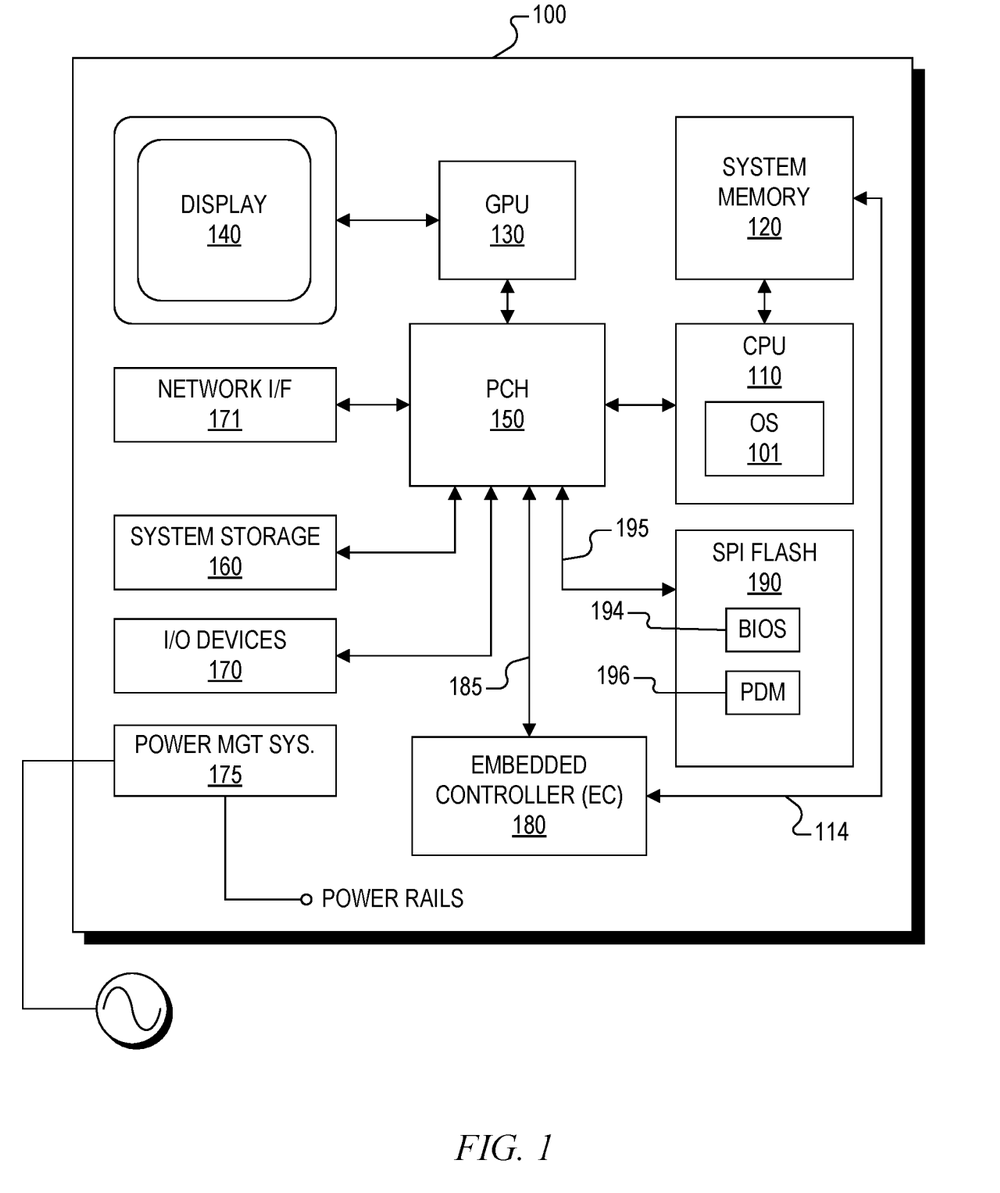
FIG. 1 is a block diagram of an information handling system as it may be configured according to one exemplary embodiment of the disclosed systems and methods.

FIG. 1 is a block diagram of an information handling system 100 (e.g., a desktop computer, laptop computer, tablet computer, MP3 player, personal data assistant (PDA), cell phone, etc.) as it may be configured according to one embodiment of the disclosed systems and methods. In this regard, it should be understood that the configuration of FIG. 1 is exemplary only, and that the disclosed methods may be implemented on other types of information handling systems. It should be further understood that while certain components of an information handling system are shown in FIG. 1 for illustrating embodiments of the disclosed systems and methods, the information handling system is not restricted to including only those components shown in FIG. 1 and described below.

As shown in FIG. 1, information handling system 100 may generally include a host processing device 110 (e.g., programmable integrated circuit such as a central processing unit (CPU)), for executing an operating system (OS) 101 (e.g., Microsoft Windows-based OS such as Windows 10, Linux OS, etc.) for system 100, and other code such as user software applications, etc. CPU 110 may also be configured to access non-volatile serial peripheral interface (SPI) Flash memory 190 to load and boot a system BIOS 194 as shown. CPU 110 may include any type of processing device, such as an Intel Pentium series processor, an Advanced Micro Devices (AMD) processor or another programmable integrated circuit. CPU 110 is coupled to system memory 120, which may include, for example, random access memory (RAM), dynamic RAM (DRAM), synchronous DRAM (SDRAM). In some embodiments, tasks and functions of SPI Flash 190 described herein may be performed by any other suitable one or more non-volatile memory (NVM) devices, e.g., including solid state drive/s (SSDs), hard drive/s, etc.

In some embodiments, information handling system 100 may include other types of processing devices including, but not limited to, a graphics processor unit (GPU) 130, a graphics-derivative processor (such as a physics/gaming processor), a digital signal processor (DSP), etc. Although GPU 130 is shown as a separate processing device in the embodiment of FIG. 1, GPU 130 may be omitted in other embodiments, when the functionality provided thereby is integrated within CPU 110 in a system-on-chip (SoC) design. In FIG. 1, display device 140 (e.g., LCD display or other suitable display device) is coupled to graphics processing unit (GPU) 130 to provide visual images (e.g., a graphical user interface, static images and/or video content) to the user. GPU 130 is, in turn, coupled to CPU 110 via platform controller hub (PCH) 150.

PCH 150 controls certain data paths and manages information flow between components of the information handling system 100. As such, PCH 150 may include one or more integrated controllers or interfaces for controlling the data paths connecting PCH 150 with CPU 110, GPU 130, system storage 160, input/output (I/O) devices 170, network interface (I/F) 171, embedded controller (EC) 180 and SPI Flash memory device 190 where BIOS firmware image (e.g., BIOS 194) is stored. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Inter-Integrated Circuit ($I^2C$) interface, a Universal Serial Bus (USB) interface and a Thunderbolt™ interface.

Local system storage 160 (e.g., one or more media drives, such as hard disk drives, optical drives, NVRAM, Flash memory, solid state drives (SSDs), or any other suitable form of internal or external storage) is coupled to PCH 150 to provide permanent storage for information handling system 100. I/O devices 170 (e.g., a keyboard, mouse, touchpad, touchscreen, etc.) are coupled to PCH 150 to enable the user to interact with information handling system 100, and to interact with application programs or other software/firmware executing thereon. The network I/F 171 enables wired and/or wireless communication with remote devices and servers or the like via external networks (not shown).

A power source for the information handling system 100 may be provided via an external power source (e.g., mains power) and an internal power supply regulator, and/or by an internal power source, such as a battery. As shown in FIG. 1, power management system 175 may be included within information handling system 100 for moderating the available power from the power source. In one embodiment, power management system 175 may be coupled to provide operating voltages on one or more power rails to one or more components of the information handling system 100, as well as to perform other power-related administrative tasks of the information handling system. For example, power management system 175 may be coupled to provide an operating voltage on a primary power rail to PCH 150, and may be further coupled to provide an operating voltage (e.g., 3.3V or other suitable voltage) on another power rail to EC 180. In addition to the power rails explicitly shown in FIG. 1, it is noted that power management system 175 may be coupled to provide additional different operating voltages on one or more additional power rails to PCH 150, EC 180 and other components of information handling system 100.

Embedded controller (EC) 180 is coupled to PCH 150 and may be configured to perform functions such as power/thermal system management, etc. EC 180 may also be configured to execute program instructions to boot information handling system 100, load application firmware from SPI Flash memory device 190 into internal memory, launch the application firmware, etc. In one example, EC 180 may include a processing device for executing program instructions to perform the above stated functions. Although not strictly limited to such, processing device of EC 180 may be implemented as a programmable integrated circuit (e.g., a controller, microcontroller, microprocessor, ASIC, etc., or as a programmable logic device "PLD" such as FPGA, complex programmable logic device "CPLD", etc.).

As shown in FIG. 1, EC 180 is coupled to PCH 150 via data bus 185, and SPI Flash memory device 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, SPI Flash memory device 190 is a shared Flash memory device, which is connected to PCH 150 and EC 180. In such a configuration, PCH 150 provides EC 180 shared access to SPI Flash memory device 190 via eSPI bus 185, SPI bus 195 and various interface and logic blocks included within the PCH.

Executable code of a peripheral device monitor (PDM) 196 is shown stored in the SPI Flash memory device 190, in which the PDM 196 is loaded during the boot process and executed on the host processing device 110 or otherwise remains active and operative during run-time of the information handling system 100. The code of the PDM 196 may alternatively be stored at any other suitable location, such as system storage 160 or the like, so long as it is loaded and operative during run-time. The code of the PDM 196 may be configured as a trusted application or a device driver or the like.

In other embodiments, executable code of peripheral device monitor (PDM) 196 be executed by other programmable integrated circuits, e.g., such as by the EC 180, or by a programmable integrated circuit integrated in a dedicated peripheral device having the sole purpose of monitoring peripherals (e.g., such as a USB PD controller). In other embodiments, the PDM executable code may not be stored in the same SPI flash 190 as BIOS 194. Rather, the PDM executable code may be stored in other storage location/s including, but not limited to, in a dedicated read only memory (ROM) of a device, in a discrete SPI flash storage, in system storage 160 (e.g., such as a hard disk drive, solid state drive, etc.). Specific examples of other PDM storage locations include, but are not limited to, secure storage area within NVRAM of system storage 160, an Extensible Firmware Interface (EFI) system partition (ESP), or the like, etc.

When its code is active and executing, the PDM 196 monitors connection and status of peripheral devices coupled to the information handling system 100 during run-time. The peripheral devices include "boot" devices that are initially coupled upon boot-up of the information handling system 100. Examples of such boot devices include, but are not limited to, docking stations, universal serial bus (USB) devices, hard disk drives (HDDs), etc.

In one embodiment, during BIOS POST the BIOS 194 verifies trust chaining to the boot devices that are initially coupled at boot time to ensure code integrity for trusted boot. If firmware verification fails, BIOS 194 prevents booting, or limits functionality of specific devices that failed verification. Assuming successful boot-up, the PDM 196 takes over trust chaining to newly coupled peripheral devices or any boot devices that have changed state, such as internal devices (e.g., hard drives, LCD controllers, biometric reader devices, cameras, touchpad controllers, etc.) that were originally verified but have since performed suspend and resume operations and should be re-verified. Upon detection of an unverified peripheral device, such as a newly connected device or a device that has since changed state, the PDM 196 performs a trust verification process to verify the unverified peripheral device similar to that performed upon boot-up. If the peripheral device is successfully verified, then the PDM 196 enables the device access to resources of the information handling system 100. If, however, the peripheral device fails the trust verification process, then the PDM 196 isolates the resources of the information handling system 100 from the unverified peripheral device as further described herein.

Figure 2:
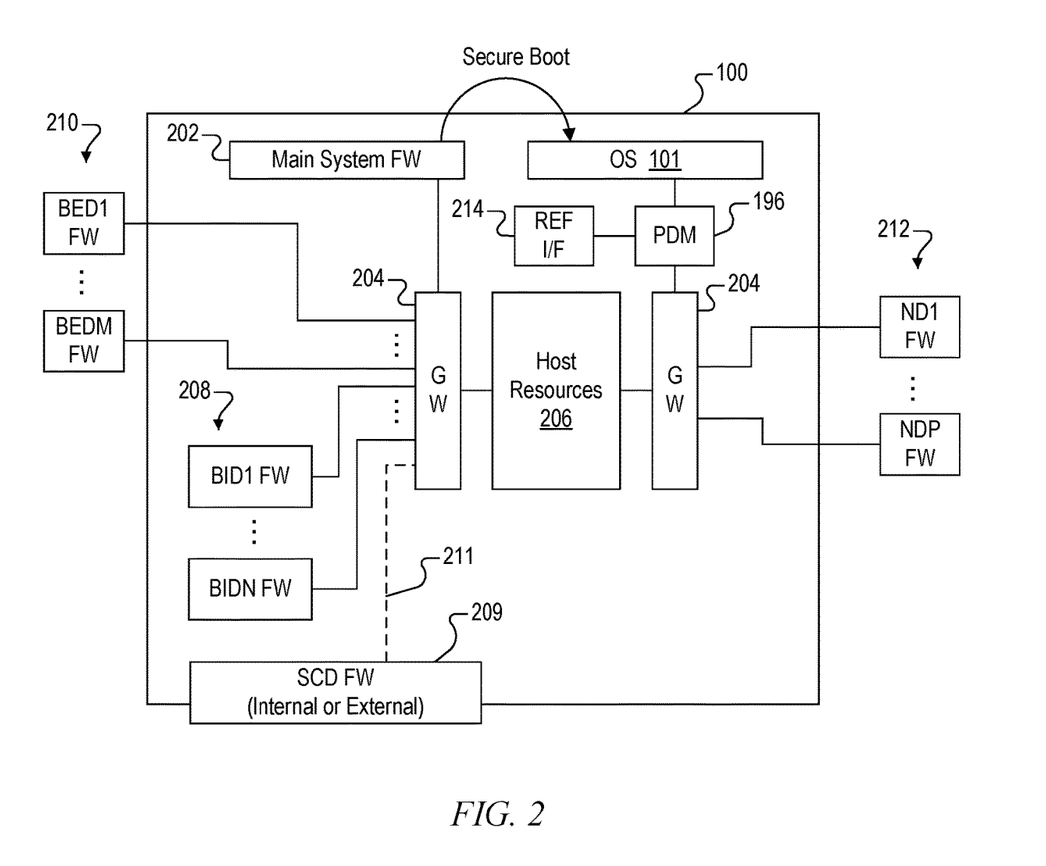
FIG. 2 is a simplified block diagram of the information handling system illustrating operation of the peripheral device monitor (PDM) of FIG. 1 according to one exemplary embodiment of the disclosed systems and methods.

FIG. 2 is a simplified block diagram of the information handling system 100 illustrating operation of the PDM 196 according to one embodiment of the disclosed systems and methods. The information handling system 100 includes main system firmware (FW) 202, the OS 101, the PDM 196, a gateway (GW) 204, host resources 206, and N "boot" internal peripheral devices 208, shown individually as BID1, . . . , BIDN, in which "N" is a positive integer of 0 or more. M "boot" external peripheral devices 210, shown individually as BED1, . . . , BEDM, in which "M" is a positive integer of 0 or more, are also shown coupled to the information handling system 100. The boot devices are intended to include any internal and external peripheral devices, such as the internal peripheral devices 208 and the external peripheral devices 210, that are connected to the information handling system 100 via the GW 204 upon boot-up of the information handling system 100. The BIOS 194 establishes the main system FW 202 which is used during boot-up of the information handling system 100 to verify the firmware (FW) of each of the boot devices.

In one exemplary embodiment, the GW 204 may include a set (e.g., plurality) of hardware (h/w) gates or ports that interface the peripheral devices, in which the h/w devices of the gateway are controlled by the main system FW 202 or the PDM 196 to block access of the host resources 206 by the peripheral devices until verified. An example of a h/w port is a universal serial bus (USB) type C or a USB power delivery (PD) incorporating PD controllers or the like on either side that communicate supported protocols and that negotiate to establish logical and/or electrical interfaces. The GW 204 may include other types of devices and/or logic that operate with similar function and may also incorporate device drivers and the like.

It will be understood that other configurations are possible. For example in alternate embodiments, functionalities of GW 204, PDM 196, OS 101 and/or Host resources 101 may be implemented in a virtualization architecture executed by programmable integrated circuit/s. For example, in one embodiment the ports, GW 204, and PDM 196 may be logical functions in driver layers in a virtual machine monitor (VMM) or hypervisor. In another embodiment, PDM 196 may be virtualized, while GW 204 remains a physical control entity in the hardware (HW). In such cases, when hot-plugged or when revalidation is required, various devices may be validated in the hypervisor, rather than in the physical hardware.

In one embodiment, the main system FW 202 controls the GW 204 to communicate with the FW of each boot device during boot-up to perform verification to ensure integrity for trusted boot. The GW 204 isolates the boot peripheral devices from the host resources 206 until verification is successful. The host resources 206 of the information handling system 100 may include, for example, the CPU 110, the system memory 120, the GPU 130 and the display 140, system storage 160, I/O devices 170, the EC 180, the host memory portion of OS 101 reserved for device drivers, and so on. Assuming successful boot and verification of each of the boot devices, the main system FW 202 controls the GW 204 to enable access of the host resources 206 by the peripheral devices 208 and 210. Upon secure boot, operational control is transferred to the OS 101 and the initial boot-up verification process is completed.

During run-time control of the OS 101, "P" new peripheral devices 212 may be coupled to the GW 204 after system boot, individually shown as ND1, . . . , NDP, in which "P" is a positive integer of 0 or more. The PDM 196 detects connection of each new peripheral device 212 via the GW 204 and controls the GW 204 to isolate the host resources 206 from the new peripheral devices 212. Although shown as external devices, the new peripheral devices 212 may include new internal or external devices that become active after secure boot. Also, one or more of the internal or external peripheral devices 208 and 210 may change state, represented, for example, as a peripheral state change device (SCD) 209. The SCD 209 may have been initially verified by the main system FW 202 during boot-up, but has since changed state during run-time so that its FW should be re-verified. State change may be, for example, a suspend and resume operation. Although only one state change device is shown, it is understood that any number of the initial boot devices may change state and need re-verification. The SCD 209 is shown coupled to the GW 204 via dashed line 211 representing that it is initially verified but has become unverified during run-time. The SCD 209 and the peripheral devices 212 are generally considered unverified peripheral devices and are initially isolated or become isolated from the host resources 206 by the GW 204 under control of the PDM 196.

As described further herein, the PDM 196 detects connection of an unverified peripheral device to the GW 204 and performs a trust verification process with the unverified peripheral device to determine whether the device may become verified. The PDM 196 controls the GW 204 to enable access of the host resources 206 by the unverified peripheral device when the unverified peripheral device becomes verified. Alternatively, the PDM 196 controls the GW 204 to maintain isolation between the host resources 206 and the unverified peripheral device if the unverified peripheral device fails the trust verification process. The PDM 196 is shown coupled to a reference interface (REF I/F) 214 that enables access to reference information either stored locally within the information handling system 100 or accessible remotely, such as via the network I/F 171 or the like. Local storage may include a local trusted platform module (TPM) or the like, or secure storage area within NVRAM of system storage 160, or an Extensible Firmware Interface (EFI) system partition (ESP), or the like.

Figure 3:
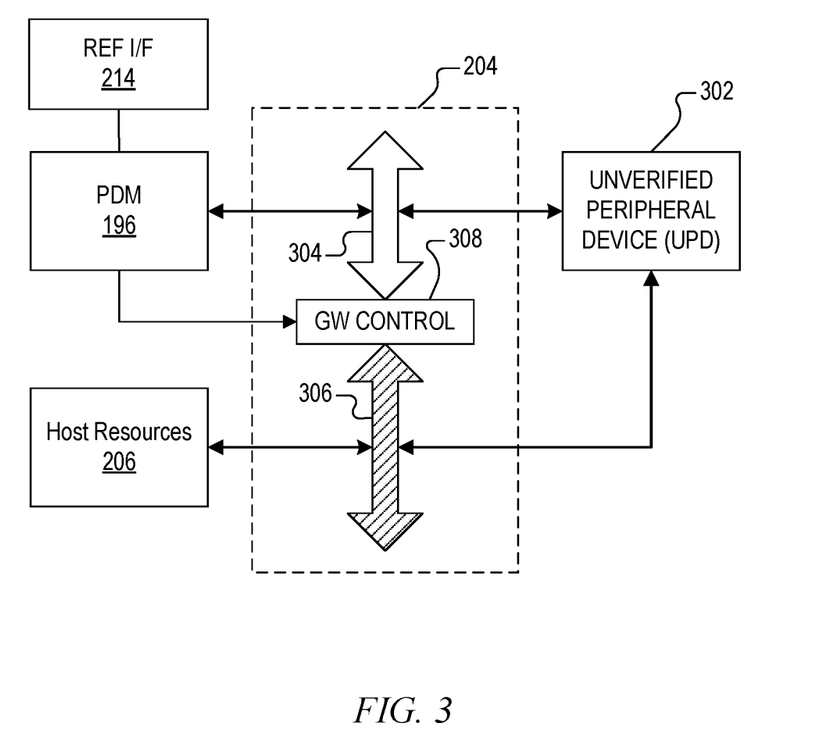
FIG. 3 is a simplified block diagram illustrating negotiation between the PDM of FIG. 1 and an unverified peripheral device (UPD) via the gateway (GW) of FIG. 2 according to one exemplary embodiment of the disclosed systems and methods.

FIG. 3 is a simplified block diagram illustrating negotiation between the PDM 196 and an unverified peripheral device (UPD) 302 via the GW 204 according to one embodiment of the disclosed systems and methods. The UPD 302 represents, for example, any new peripheral device 212 or any SCD 209 that was initially verified but has since changed state and should be re-verified. The GW 204 is illustrated with multiple portions or sections, including a negotiation interface 304 that enables communication between the PDM 196 and the UPD 302, an access interface 306 that enables communication between the UPD 302 and the host resources 206 once the UPD 302 has been successfully verified by the PDM 196, and a GW control interface 308 controlled by the PDM 196 to lock or unlock the access interface 306. The access interface 306 is shown shaded to represent that communication between the UPD 302 and the host resources 206 is allowed only after being enabled by the GW control interface 308. The access interface 306 is initially locked until released by the GW control interface 308 under control of the PDM 196 when the UPD 302 successfully passes the trust verification process as further described herein. The PDM 196 has access to reference information via the REF I/F 214 for purposes of verifying the UPD 302.

Figure 4:
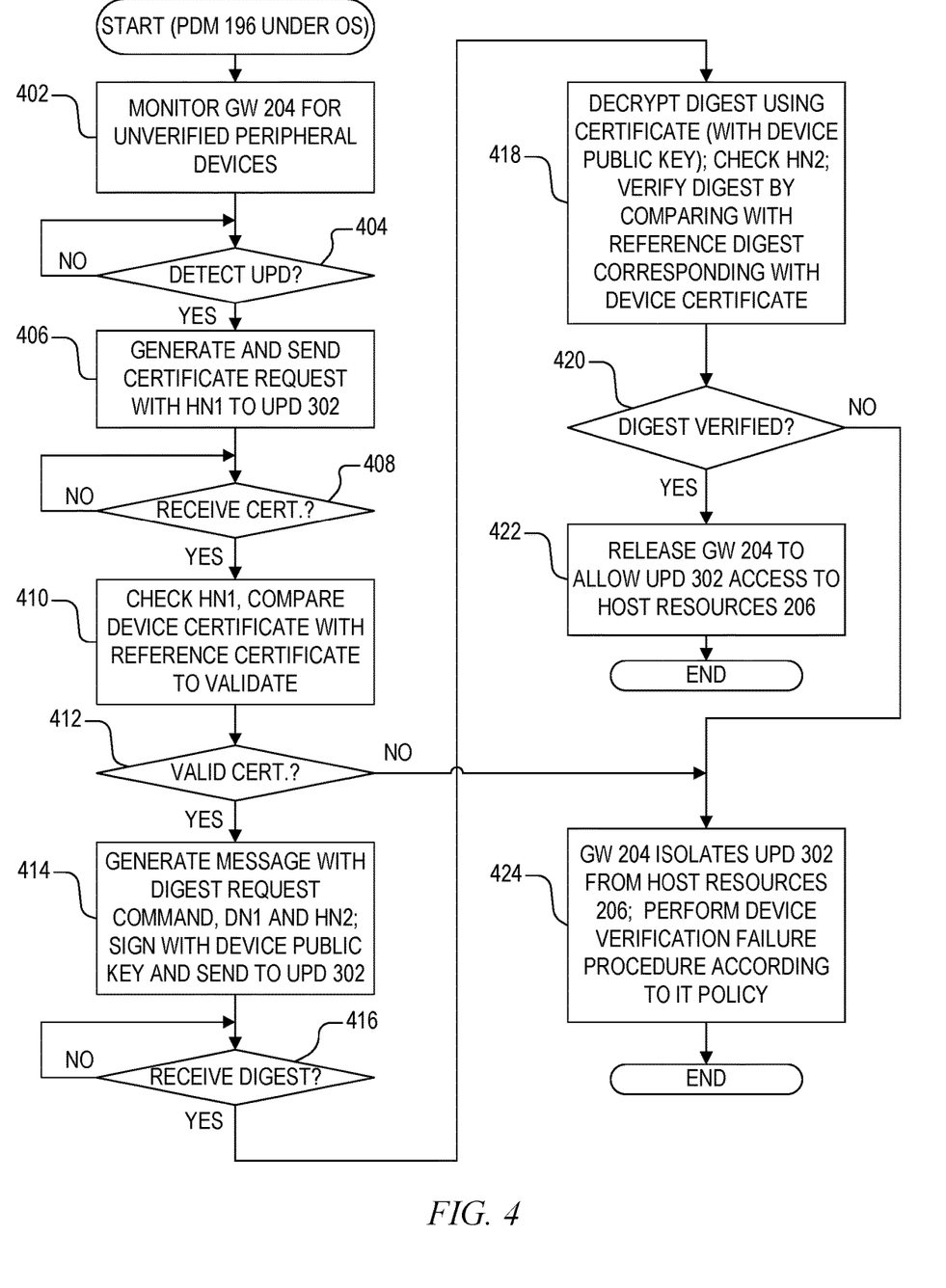
FIG. 4 is a flowchart diagram illustrating operation of the PDM of FIG. 1 during a trust verification process when negotiating with the UPD of FIG. 3 according to one exemplary embodiment of the disclosed systems and methods.

FIG. 4 is a flowchart diagram illustrating operation of the PDM 196 during the trust verification process when negotiating with the UPD 302 according to one embodiment of the disclosed systems and methods. Operation starts when the PDM 196 becomes active under the OS 101 after secure boot of the information handling system 100. At block 402, the PDM 106 begins operation by monitoring the GW 204 (e.g., the negotiation interface 304) to detect any unverified peripheral devices connected thereto. Operation loops at next block 404 until an unverified peripheral device (UPD) is detected connected to the GW 204. When a UPD is detected, such as, for example, the UPD 302, operation advances to block 406 in which the PDM 196 generates and sends a certificate request along with a first host nonce HN1 to the UPD 302. The certificate request is a request for a valid device certificate from the UPD 302. A nonce is an arbitrary or random number generated and used by a device during negotiations to detect and prevent replay or out of sequence attacks during a trusted session. The PDM 196 of the host computer expects a response communication from the UPD 302 to include HN1, since otherwise the device may be considered a hostile device attempting an attack, in which case the response is ignored. Operation loops at next block 408 until the requested certificate is received from the UPD 302.

When the PDM 196 receives a response from the UPD 302, it checks the response for HN1 and verifies the signed digest of the message using the public key from the certificate (to ensure message integrity) to ensure that the communication is from the UPD 302. If not received in the response communication, then the PDM 196 may take a predetermined action or may simply ignore the communication. Assuming HN1 is received, the PDM 196 validates the received certificate by comparing it with reference certificates accessed via the REF I/F 214. The validation may be a service located on the platform of the information handling system 100 or may be a server or back-end service accessed remotely (e.g., via the internet or other cloud resource). In one embodiment, for example, valid certificates may be provisioned by an original equipment manufacturer (OEM) or the like in which only those devices or device types that are pre-authorized may be validated. If the certificate is validated as determined at next block 412, such as being equal to a reference certificate, then operation advances to block 414 in which the PDM 196 generates a message with a digest request command along with a second host nonce HN2 and a first device nonce DN1 if received from the UPD 302. The UPD 302 may also generate the DN1 to confirm that communications are from the PDM 196 rather than from an attacking device. The device certificate is, or includes, a public key used by the UPD 302 for encrypting communications. The PDM 196 signs the digest request using the public key of the UPD 302 so that only the UPD 302 may decrypt and access the request. The PDM 196 sends the signed request to the UPD 302 and operation loops at next block 416 until a response is received.

When a response is received from the UPD 302, operation advances to next block 418 in which the PDM 196 decrypts the response using the device public key, checks for the presence of HN2 to ensure a valid response from the UPD 302, and then verifies the received digest with a reference digest accessed via the REF I/F 204 that corresponds with the validated certificate. The device digest is the product of a hash of the boot code or firmware of the UPD 302, which is verified by comparing with a pre-authorized reference digest. If the device digest is successfully verified as determined at next block 420, then operation advances to block 422 in which the PDM 196 indicates to the GW control interface 308 to release the access interface 306 of the GW 204 to enable the UPD 302 to access the host resources 206. The firmware (FW) of the UPD 302 may then be bonded with the system FW of the information handling system 100 to allow normal operation of the UPD 302 as a verified and authorized peripheral device, an operation is completed.

When the certificate received from the UPD 302 is not valid as determined at block 412, or if the device digest is not verified at block 420, then operation instead advances to block 424 in which the PDM 196 does not unlock the GW 204 so that the UPD 302 remains isolated and blocked from the host resources 206. In addition, the PDM 196 may perform a device verification procedure or process according to a predetermined information technology (IT) policy. The process may include sending a message to an IT administrator and/or recovering known valid firmware, and operation is completed.

Figure 5:
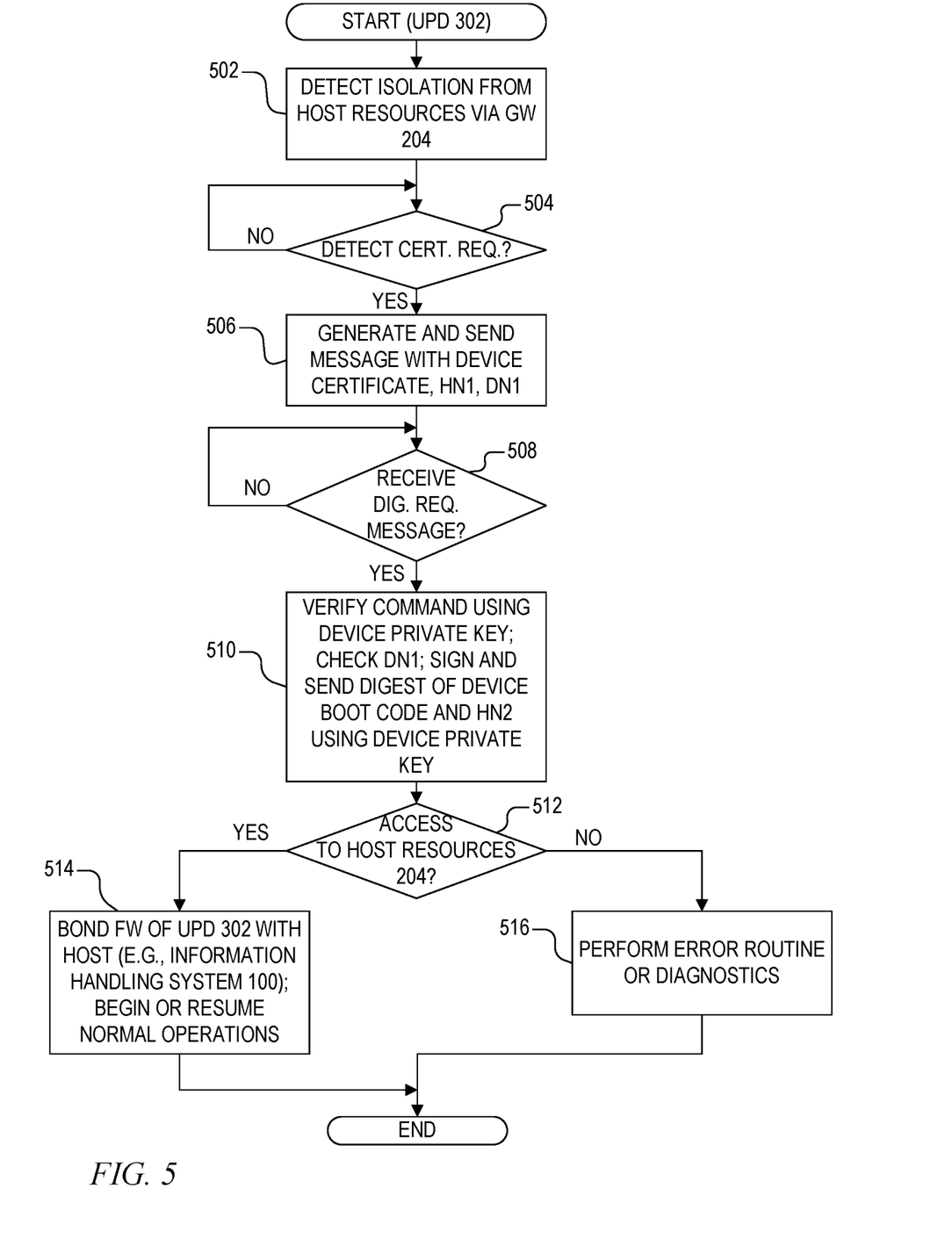
FIG. 5 is a flowchart diagram illustrating operation of the UPD of FIG. 3 during the trust verification process when negotiating with the PDM of FIG. 1 according to one exemplary embodiment of the disclosed systems and methods.

FIG. 5 is a flowchart diagram illustrating operation of the UPD 302 during the trust verification process when negotiating with the PDM 196 according to one embodiment of the disclosed systems and methods. At first block 502, the UPD 302 detects isolation from the host resources via the GW 204, although the UPD 302 may detect connection to the PDM 196. At next block 502, the UPD 302 loops while waiting for the certificate request from the PDM 196 as previously described with reference to block 406. If and when received, operation advances to block 506 in which the UPD 302 generates and sends it device certificate along with the received host nonce HN1 and its own device nonce DN1. The UPD 302 then loops at block 508 while waiting for the PDM 196 to validate its certificate and send a message with a digest request command. Assuming the certificate is validated and the PDM 196 responds with the message with the digest request command as determined at block 508, operation advances to block 510 in which the UPD 302 decrypts the received message to verify the command using its private key, checks to ensure that DN1 is received, and if so, signs the digest of its device boot code and received host nonce HN2 using its private key and sends the encrypted digest to the PDM 196. The UPD 302 then loops at block 512 waiting for the PDM 196 to verify its digest and allow access to the host resources 204.

If and when the UPD 302 receives an authorization indication from the PDM 196 or otherwise detects access to the host resources 204 as determined at block 512, operation advances to block 514 in which the UPD 302 bonds its firmware or boot code with the host (e.g., the information handling system 100), and begins or otherwise resumes normal operations and operation is completed. On the other hand, if the PDM 196 indicates failure of the trust verification process by the UPD 302 or otherwise is not granted access to the host resources 204, such as after a predetermined timeout period, then operation instead advances to block 516 in which the UPD 302 may perform an error routine or other diagnostics. Operation may be completed at this time or otherwise the UPD 302 may attempt to negotiate with the PDM 196 again.

The flowchart diagrams shown in FIGS. 4 and 5 are simplified in that many intermediate or collateral steps are not shown. For example, when the PDM 196 is waiting for a response from the UPD 302, or vice-versa when the UPD 302 is waiting for a response from the PDM 196, a timeout period may be established causing an error condition in which the negotiates are reset or restarted.

In an alternative embodiment, the PDM 196 may send a public key of the information handling system 100 to the UPD 302 along with the first request for the device certificate as described for block 406. The UPD 302 receives the host public key and uses it to encrypt subsequent communications to the PDM 196, and the PDM 196 decrypts received messages using its private key. That way, only the PDM 196 can decrypt the messages received from the UPD 302 during the negotiation process. Similarly, the PDM 196 encrypts subsequent communications to the UPD 302 using the received public key of the UPD 302, so that only the UPD 302 can decrypt the messages received from the PDM 196 during the negotiation process using its private key.

It will be understood that the steps of shown and described herein are exemplary only, and that any combination of fewer, additional and/or alternative steps may be employed that is suitable for verifying an unverified peripheral device that is connected to an information handling system after secure boot, or that changes state during system run-time.

It will also be understood that one or more of the tasks, functions, or methodologies described herein (e.g., including those described herein for components 110, 130, 180, 204, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A system, comprising:
   a gateway that separates peripheral devices from hardware host resources of an information handling system, the gateway being coupled between the peripheral devices and the hardware host resources of the information handling system to control access of the hardware host resources of the information handling system across the gateway by any of the peripheral devices; and
   at least one programmable integrated circuit that is programmed to: detect a new or existing connection of an unverified peripheral device to the gateway during run-time of the system, perform a trust verification process with the unverified peripheral device, control the gateway to enable access of the hardware host resources across the gateway by the unverified peripheral device when the unverified peripheral device becomes verified, and control the gateway to prevent access to the hardware host resources across the gateway by the unverified peripheral device when the unverified peripheral device fails the trust verification process;
   where the programmable integrated circuit is programmed to: request a device certificate from the unverified peripheral device, then attempt to validate the device certificate received from the unverified peripheral device by comparing the received device certificate with a corresponding reference certificate that is provisioned by an original equipment manufacturer (OEM) of the system only for peripheral devices pre-authorized by the OEM, then request a digest of device boot code from the unverified peripheral device only if the received device certificate is validated to be equal to the reference certificate, then attempt to verify the digest of the peripheral device boot code received from the peripheral device by comparing the received digest with a corresponding pre-authorized reference digest, and then control the gateway to enable access of the hardware host resources by the unverified peripheral device only if the received digest is verified.

2. The system of claim 1, where the programmable integrated circuit is programmed to: deny access of the hardware host resources by the unverified peripheral device if the received device certificate is determined to be invalid.

3. The system of claim 1, where the programmable integrated circuit is programmed to perform a predetermined verification failure procedure when the unverified peripheral device fails the trust verification process.

4. The system of claim 3, where the predetermined verification failure procedure comprises sending a message to an IT administrator and recovering known valid firmware.

5. The system of claim 1, where the gateway comprises at least one controllable hardware input/output port for enabling or disabling access.

6. The system of claim 1, where the unverified peripheral device is coupled to the gateway after secure boot of the information handling system.

7. The system of claim 1, where the unverified peripheral device is initially verified upon boot-up of the information handling system, and where the at least one programmable integrated circuit changes status of the unverified peripheral device to unverified after secure boot in response to a change of state of the unverified peripheral device.

8. The system of claim 1, where the hardware host resources comprise at least one of a graphics processor unit (GPU), a display, a system storage, an input/output (I/O) device, at least a portion of a system memory, or an embedded controller (EC).

9. The system of claim 1, where the gateway comprises a plurality of gates coupled between the peripheral devices and the hardware host resources of the information handling system, each of the gates being controllable to block or allow access for a given peripheral device across the gateway to the hardware host resources.

10. A system, comprising:
    a gateway that separates peripheral devices from hardware host resources of an information handling system, the gateway being coupled between the peripheral devices and the hardware host resources of the information handling system to control access of the hardware host resources of the information handling system across the gateway by any of the peripheral devices; and
    at least one programmable integrated circuit that is programmed to: detect a new or existing connection of an unverified peripheral device to the gateway during run-time of the system, perform a trust verification process with the unverified peripheral device, control the gateway to enable access of the hardware host resources across the gateway by the unverified peripheral device when the unverified peripheral device becomes verified, and control the gateway to prevent access to the hardware host resources across the gateway by the unverified peripheral device when the unverified peripheral device fails the trust verification process;
    where the programmable integrated circuit is programmed to: request a device certificate from the unverified peripheral device, then attempt to validate the device certificate then received from the unverified peripheral device by comparing the received device certificate with a corresponding reference certificate that is provisioned by an original equipment manufacturer (OEM) of the system only for peripheral devices pre-authorized by the OEM, then request a digest of device boot code from the unverified peripheral device only if the received device certificate is validated to be equal to the reference certificate, then attempt to verify the digest of the peripheral device boot code then received from the peripheral device by comparing the received digest with a corresponding pre-authorized reference digest, and then deny access of the hardware host resources by the unverified peripheral device only if the received digest is not successfully verified.

11. A system, comprising:
a gateway that separates peripheral devices from hardware host resources of an information handling system, the gateway being coupled between the peripheral devices and the hardware host resources of the information handling system to control access of the hardware host resources of the information handling system across the gateway by any of the peripheral devices; and
at least one programmable integrated circuit that is programmed to: detect a new or existing connection of an unverified peripheral device to the gateway during run-time of the system, perform a trust verification process with the unverified peripheral device, control the gateway to enable access of the hardware host resources across the gateway by the unverified peripheral device when the unverified peripheral device becomes verified, and control the gateway to prevent access to the hardware host resources across the gateway by the unverified peripheral device when the unverified peripheral device fails the trust verification process;
where the trust verification process comprises generating a first host nonce, sending the first host nonce with a request for a device certificate to the unverified peripheral device, then receiving the device certificate from the unverified peripheral device, then determining whether the received device certificate is provided by the unverified peripheral device together with the first host nonce to ensure valid communication with the unverified peripheral device, and then only if the first host nonce is determined to be received together with the device certificate from the unverified peripheral device comparing the received device certificate with a corresponding reference certificate that is provisioned by an original equipment manufacturer (OEM) of the system only for peripheral devices pre-authorized by the OEM to validate the device certificate.

12. The system of claim 11, where the trust verification process further comprises performing the following only if the device certificate is validated: then generating a second host nonce, then encrypting and sending to the unverified peripheral device a message including a digest request and the second host nonce, then decrypting an encrypted response received from the unverified peripheral device to retrieve a device digest of the peripheral device boot code and the second host nonce, then determining whether the received device digest is received from the unverified peripheral device together with the second host nonce to ensure valid communication with the unverified peripheral device, and then only if the second host nonce is determined to be received together with the device digest from the unverified peripheral device comparing the received device digest with a corresponding pre-authorized reference digest to verify the device digest.

13. The system of claim 12, where the programmable integrated circuit is further programmed to: receive a first device nonce from the unverified peripheral device together with the device certificate received from the unverified peripheral device, and then provide the received first device nonce together with the digest request and the generated second host nonce transmitted to the unverified peripheral device.

14. A method, comprising:
detecting a new or existing connection of an unverified peripheral device to a gateway of an information handling system during run-time of the information handling system, the gateway being coupled between the unverified peripheral device and hardware host resources of the information handling system to separate the unverified peripheral device from the hardware host resources of the information handling system;
controlling the gateway to initially prevent access of the hardware host resources of the information handling system across the gateway by the unverified peripheral device;
performing a trust verification process with the unverified peripheral device;
controlling the gateway to allow access of the hardware host resources of the information handling system across the gateway by the unverified peripheral device when the unverified peripheral device passes the trust verification process and becomes verified; and
maintaining control of the gateway to prevent access of hardware host resources of the information handling system across the gateway by the unverified peripheral device when the unverified peripheral device fails the trust verification process;
where the performing a trust verification process comprises:
requesting a device certificate from the unverified peripheral device,
then attempting to validate a received device certificate received from the unverified peripheral device by comparing the received device certificate with a corresponding reference certificate that is provisioned by an original equipment manufacturer (OEM) of the information handling system only for peripheral devices pre-authorized by the OEM,
then requesting a digest of device boot code from the unverified peripheral device only if the received device certificate is validated to be equal to the reference certificate,
then attempting to verify the digest of the peripheral device boot code received from the peripheral device, and
then controlling the gateway to enable access of the hardware host resources by the unverified peripheral device only if the received digest is verified.

15. The method of claim 14, where the performing a trust verification process further comprises:
requesting a device certificate from the unverified peripheral device;
then attempting to validate the device certificate received from the unverified peripheral device by comparing the received device certificate with a corresponding reference certificate that is provisioned by an original equipment manufacturer (OEM) of the system only for peripheral devices pre-authorized by the OEM; and
then denying access of the hardware host resources by the unverified peripheral device if the received device certificate is determined to be invalid.

16. The method of claim 14, further comprising performing a predetermined verification failure procedure when the unverified peripheral device fails the trust verification process.

17. The method of claim 16, where the performing the predetermined verification failure procedure comprises sending a message to an IT administrator and recovering known valid firmware.

18. The method of claim 14, providing at least one controllable hardware input/output port for implementing the gateway for enabling or disabling access.

19. The method of claim 14, where the detecting connection of an unverified peripheral device comprises detecting connection of the unverified peripheral device to the gateway after secure boot of the information handling system.

20. The method of claim 14, where the detecting connection of an unverified peripheral device comprises:
   detecting a change of state of the unverified peripheral device that was initially verified upon boot-up of the information handling system; and
   changing status of the unverified peripheral device to unverified after secure boot in response to the change of state of the unverified peripheral device.

21. The method of claim 14, where the hardware host resources comprise at least one of a graphics processor unit (GPU), a display, a system storage, an input/output (I/O) device, at least a portion of a system memory, or an embedded controller (EC).

22. The method of claim 14, where the gateway comprises a gate coupled between the unverified peripheral device and the hardware host resources of the information handling system; and where the method further comprises controlling the gate to block or allow access for the unverified peripheral device across the gateway to the hardware host resources.

23. A method, comprising:
   detecting a new or existing connection of an unverified peripheral device to a gateway of an information handling system during run-time of the information handling system, the gateway being coupled between the unverified peripheral device and hardware host resources of the information handling system to separate the unverified peripheral device from the hardware host resources of the information handling system;
   controlling the gateway to initially prevent access of the hardware host resources of the information handling system across the gateway by the unverified peripheral device;
   performing a trust verification process with the unverified peripheral device;
   controlling the gateway to allow access of the hardware host resources of the information handling system across the gateway by the unverified peripheral device when the unverified peripheral device passes the trust verification process and becomes verified; and
   maintaining control of the gateway to prevent access of hardware host resources of the information handling system across the gateway by the unverified peripheral device when the unverified peripheral device fails the trust verification process;
   where the performing a trust verification process comprises:
      requesting a device certificate from the unverified peripheral device,
      then attempting to validate the device certificate then received from the unverified peripheral device by comparing the received device certificate with a corresponding reference certificate that is provisioned by an original equipment manufacturer (OEM) of the system only for peripheral devices pre-authorized by the OEM,
      then requesting a digest of device boot code from the unverified peripheral device only if the received device certificate is validated to be equal to the reference certificate,
      then attempting to verify the digest of the peripheral device boot code then received from the peripheral device by comparing the received digest with a corresponding pre-authorized reference digest, and
      then denying access of the hardware host resources by the unverified peripheral device only if the received digest is not successfully verified.

24. A method, comprising:
   detecting a new or existing connection of an unverified peripheral device to a gateway of an information handling system during run-time of the information handling system, the gateway being coupled between the unverified peripheral device and hardware host resources of the information handling system to separate the unverified peripheral device from the hardware host resources of the information handling system;
   controlling the gateway to initially prevent access of the hardware host resources of the information handling system across the gateway by the unverified peripheral device;
   performing a trust verification process with the unverified peripheral device;
   controlling the gateway to allow access of the hardware host resources of the information handling system across the gateway by the unverified peripheral device when the unverified peripheral device passes the trust verification process and becomes verified; and
   maintaining control of the gateway to prevent access of hardware host resources of the information handling system across the gateway by the unverified peripheral device when the unverified peripheral device fails the trust verification process;
   where the performing a trust verification process comprises:
      generating a first host nonce,
      sending the first host nonce with a request for a device certificate to the unverified peripheral device,
      then receiving the device certificate from the unverified peripheral device,
      then determining whether the received device certificate is provided by the unverified peripheral device together with the first host nonce to ensure valid communication with the unverified peripheral device, and
      then only if the first host nonce is determined to be received together with the device certificate from the unverified peripheral device comparing the received device certificate with a corresponding reference certificate that is provisioned by an original equipment manufacturer (OEM) of the system only for peripheral devices pre-authorized by the OEM to validate the device certificate.

25. The method of claim 24, where the performing a trust verification process further comprises performing the following only if the device certificate is validated:
   then generating a second host nonce;
   then encrypting and sending to the unverified peripheral device a message including a digest request and the second host nonce;

then decrypting an encrypted response received from the unverified peripheral device to retrieve a device digest of the peripheral device boot code and the second host nonce;

then determining whether the received device digest is received from the unverified peripheral device together with the second host nonce to ensure valid communication with the unverified peripheral device; and then only if the second host nonce is determined to be received together with the device digest from the unverified peripheral device comparing the received device digest with a reference digest to verify the device digest.

26. The method of claim 25, further comprising responding in the unverified peripheral device to the request for the device certificate by generating and sending a first device nonce from the unverified peripheral device together with the device certificate and the first host nonce, and then providing the received first device nonce together with the digest request and the generated second host nonce transmitted to the unverified peripheral device.

\* \* \* \* \*